United States Patent
AO

(10) Patent No.: US 10,447,600 B2
(45) Date of Patent: Oct. 15, 2019

(54) LOAD BALANCING METHOD, DEVICE AND SYSTEM FOR SERVICE FUNCTION CHAIN

(71) Applicant: ZTE Corporation, Shenzhen, Guangdong Province (CN)

(72) Inventor: Ting AO, Shenzhen (CN)

(73) Assignee: ZTE CORPORATION (CN)

(\*) Notice: Subject to any disclaimer, the term of this patent is extended or adjusted under 35 U.S.C. 154(b) by 101 days.

(21) Appl. No.: 15/559,828

(22) PCT Filed: Sep. 23, 2015

(86) PCT No.: PCT/CN2015/090456
§ 371 (c)(1),
(2) Date: Sep. 19, 2017

(87) PCT Pub. No.: WO2016/150131
PCT Pub. Date: Sep. 29, 2016

(65) Prior Publication Data
US 2018/0054389 A1 Feb. 22, 2018

(30) Foreign Application Priority Data
Mar. 20, 2015 (CN) .......................... 2015 1 0125738

(51) Int. Cl.
*H04L 12/803* (2013.01)
*H04L 12/707* (2013.01)
*H04L 12/715* (2013.01)
(Continued)

(52) U.S. Cl.
CPC ............ *H04L 47/125* (2013.01); *H04L 45/24* (2013.01); *H04L 45/64* (2013.01); *H04L 69/22* (2013.01); *H04L 45/38* (2013.01)

(58) Field of Classification Search
CPC ....... H04L 47/125; H04L 45/24; H04L 45/38; H04L 45/64; H04L 69/22
See application file for complete search history.

(56) References Cited

U.S. PATENT DOCUMENTS 6,144,639 A 11/2000 Zhao et al.
2014/0362857 A1\* 12/2014 Guichard .............. H04L 45/566
370/392
(Continued)

FOREIGN PATENT DOCUMENTS

CN 101699786 A 4/2010
CN 102868631 A 1/2013
(Continued)

OTHER PUBLICATIONS

International Search Report and Written Opinion dated Dec. 29, 2015 for PCT Application No. PCT/CN2015/090456.
(Continued)

*Primary Examiner* — Paul H Masur
(74) *Attorney, Agent, or Firm* — McDonald Hopkins LLC

(57) ABSTRACT

Provided are a method for load balancing of a Service Function Chain (SFC), a Service Function forwarder (SFF), a classification device, a controller and an SFC system. The method includes: an SFF receives a packet, herein an SFC header of the packet carries a Service Function Chain Flow Identifier (SFCFID); and the SFF forwards the packet in a load balancing path according to the SFCFID carried in the SFC header of the packet.

20 Claims, 4 Drawing Sheets

(51) Int. Cl.
  *H04L 29/06*   (2006.01)
  *H04L 12/721*   (2013.01)

(56) References Cited

U.S. PATENT DOCUMENTS

| | | | | |
|---|---|---|---|---|
| 2015/0263901 A1* | 9/2015 | Kumar | ................... | H04L 41/12 370/254 |
| 2015/0295831 A1* | 10/2015 | Kumar | ................. | H04L 47/125 370/235 |
| 2016/0028640 A1* | 1/2016 | Zhang | ................. | H04L 45/306 370/389 |
| 2016/0165014 A1* | 6/2016 | Nainar | ................... | H04L 69/22 370/392 |
| 2016/0173373 A1* | 6/2016 | Guichard | ................ | H04L 45/74 370/392 |
| 2016/0248858 A1* | 8/2016 | Qiu | ......................... | H04L 67/16 |
| 2017/0048148 A1* | 2/2017 | Huang | ............... | H04L 67/1002 |
| 2017/0111267 A1* | 4/2017 | Lin | ........................ | H04L 29/06 |
| 2017/0118121 A1* | 4/2017 | Akiyoshi | ............. | H04W 28/08 |
| 2017/0180257 A1* | 6/2017 | Guichard | ................ | H04L 45/74 |
| 2017/0187572 A1* | 6/2017 | Wu | ........................ | H04L 29/08 |

FOREIGN PATENT DOCUMENTS

| | | | |
|---|---|---|---|
| CN | 103929492 A | | 7/2014 |
| CN | 104283806 A | | 1/2015 |
| EP | 3125505 A1 | | 2/2017 |
| KR | 20080046900 A | | 5/2008 |

OTHER PUBLICATIONS

P. Quinn; J. Guichard; S Kumar; M Smith; Cisco Systems, Inc.; et al. Network Service Header; draft-quinn-sfc-nsh-07.txt, Network Service Header; DRAFT-QUINN-SFC-NSH-07.TXT, Internet Engineering Task Force, IETF; STANDARDWORKINGDRAFT, Internet Society (ISOC), 4, Rue Des Falaises CH-1205 Geneva, Switzerland, Feb. 24, 2015, pp. 1-43, XP015104903.

Extended European Search Report dated Feb. 7, 2018 for European Patent Application No. 15886053.6.

European Communication Pursuant to Article 94(3) EPC for European Patent Application No. EP15886053.6, dated Jan. 28, 2019.

Halpern et al.: "Service Function Chaining (SFC) Architecture; draft-ietf-sfc-architecture-07.txt", Service Function Chaining (SFC) Architecture; Draft-IETF-SFC-Architecture-07.TXT, Internet Engineering Task Force, IETF; Standardworkingdraft, Internet Society (ISOC) 4, Rue des Falaises CH-1205 Geneva, Switzerland, Mar. 6, 2015, pp. 1-28, XP015105166, [retrieved on Mar. 6, 2015].

Office Action for Chinese Patent Application No. 201510125738.5 dated Apr. 29, 2019.

\* cited by examiner

| Ver | O | R | SFCFID | Length | MD Type | Next protocol |
|---|---|---|---|---|---|---|
| SFPID | | | | | | Service index |
| Metadata | | | | | | |
FIG. 4A
| Ver | O | F | R | Length | MD Type | Next protocol |
|---|---|---|---|---|---|---|
| SFPID | | | | | | Service index |
| SFCFID TLV | | | | | | |
| Other metadata | | | | | | |
FIG. 4B
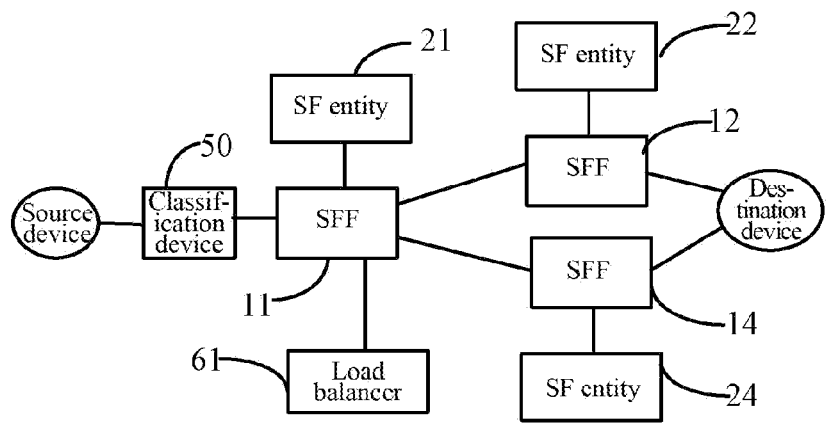
FIG. 5
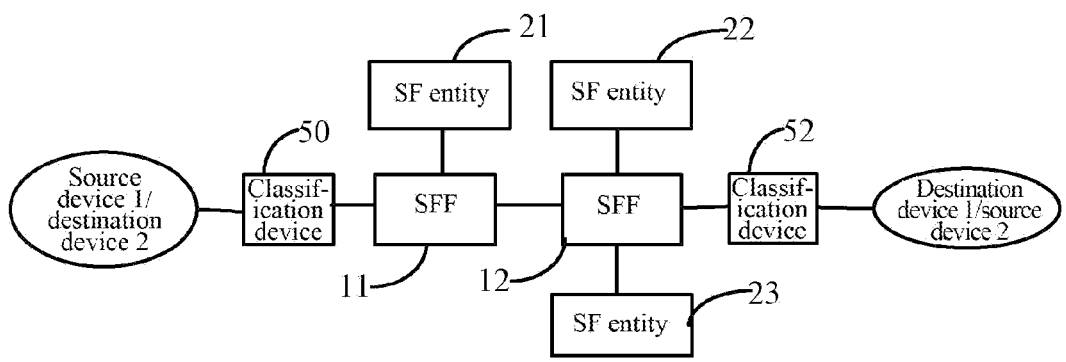
FIG. 6

LOAD BALANCING METHOD, DEVICE AND SYSTEM FOR SERVICE FUNCTION CHAIN

TECHNICAL FIELD

The document relates to, but is not limited to, the field of communications, and more particularly to a method, apparatus and system for load balancing of a Service Function Chain (SFC).

BACKGROUND

In the existing art, data needs to access a great number of value added service devices, such as an anti-virus device, an acceleration device, a firewall device and a Network Address Translation (NAT) device when data accesses a network. Flow without distinguishing for differences must pass through these service devices once, so unnecessary burdens are caused on these devices, and optimization of service resources is limited, and the configuration is complex, and it is difficult to realize a rapid change of the service configuration.

For the above-mentioned problem, the existing art proposed a service chain manner SFC, namely, integrating all services for servicing, virtualizing a Service overlay layer, forming an own service topology and decoupling from an underlying network to be not limited by an underlying network structure. The architecture is as shown in FIG. 1. Services through which flows will pass are determined by SFCs. The SFC classifies packets and allocates different SFCs to different levels of flows (by an entrance classification device) through adding a Service Function Path Identifier (SFPID) for each SFC. A forwarder forwards the packets according to the identifiers of the SFCs. Thus, different service chain processings can be implemented for different flows to meet differentiation requirements.

For these Service Function (SF) entities, when processing flows are excessive, corresponding SF entities cannot process a great number of flows in time, and the reliability of a system will be reduced.

SUMMARY

The following is a brief introduction for a subject described herein in detail. The brief introduction is not intended to restrict the protection scope of claims.

Embodiments of the present disclosure provide a method for load balancing of an SFC, a Service Function Forwarder (SFF), a classification device, a controller and an SFC system, used to solve the problem in the existing art where an SF entity in an SFC cannot perform processing in time in case of excessive flow.

An embodiment of the present disclosure provides a method for load balancing of an SFC. The method includes the steps as follows.

An SFF receives a packet; herein an SFC header of the packet carries a Service Function Chain Flow Identifier (SFCFID).

The SFF forwards the packet in a load balancing path according to the SFCFID carried in the SFC header of the packet.

In an exemplary embodiment, before the SFF forwards the packet in the load balancing path according to the SFCFID carried in the SFC header of the packet, the method further includes the step as follows.

The SFF reads the SFCFID carried in the SFC header of the packet according to a load balancing identifier carried in the SFC header of the packet or a load balancing path to which a next hop of the SFF belongs.

In an exemplary embodiment, the step that the SFF forwards the packet in a load balancing path according to the SFCFID carried in the SFC header of the packet includes that:

when the SFF is connected to two or more SF entities, after receiving a packet sent by a classification device or an SFF connected to a last hop SF entity, the SFF selects one of the two or more SF entities to forward the packet according to the SFCFID carried in the SFC header of the packet;

or, when a next hop of the SFF includes two or more SF entities, the step that the SFF selects one of load balancing paths to forward the packet according to the SFCFID carried in the SFC header of the packet includes:

after receiving a packet sent by a connected SF entity, the SFF sends the packet to an SFF connected to one of the two or more SF entities according to the SFCFID carried in the SFC header of the packet.

In an exemplary embodiment, the method further includes the steps as follows.

A new SF entity is added in an SFC path, herein the new SF entity is used for bearing load balancing for an original SF entity.

A controller sends an SF registration message to an SFF connected to the new SF entity; and/or, when the SFF corresponding to the new SF entity is not on the SFC path, the controller sends a forwarder registration message to an SFF connected to a last hop of the original SF entity.

In an exemplary embodiment, the method further includes the steps as follows.

The controller sends a load balancing path adding message to a classification device or a load balancer.

The classification device encapsulates an SFCFID in an SFC header of a packet according to the received load balancing path adding message; or, the load balancer encapsulates an SFCFID in an SFC header of a packet according to the received load balancing path adding message; or, when needing to select a load balancing path for forwarding a packet, the classification device notifies the controller of the packet, receives a corresponding SFCFID sent by the controller, and encapsulates the corresponding SFCFID in the SFC header of the packet.

In an exemplary embodiment, the method further includes the steps as follows.

The SFF receives an SF registration message sent by a controller, and adds, according to the SF registration message, a corresponding new SF entity in a path indicated by a corresponding SFPID;

and/or, the SFF receives a forwarder registration message sent by the controller.

In an exemplary embodiment, adding, according to the SF registration message, a corresponding new SF entity in a path indicated by a corresponding SFPID includes that: the SFF reads an SFPID in the SF registration message, and judges whether the SFF is on the path indicated by the SPFID according to the SFPID in the SF registration message;

when a judgment result is that the SFF is on the path indicated by the SPFID, the SFF adds the new SF entity as an SF entity connected to the SFF; and when a judgment result is that the SFF is not on the path indicated by the SPFID, the SFF adds an SFC path where the new SF entity is located into a local forwarding table.

In an exemplary embodiment, the SF registration message includes an SFPID and an identifier corresponding to the new SF entity.

In an exemplary embodiment, the forwarder registration message includes an SFPID, an identifier of the new SF entity, and information for indicating a position of the new SF entity in an SFC.

In an exemplary embodiment, the method further includes: the SFF adds the new SF entity as a next hop of the SFF according to the forwarder registration message.

In an exemplary embodiment, the step that the SFF forwards the packet in a load balancing path according to the SFCFID carried in the SFC header of the packet includes that: when selecting a load balancing path, the SFF acquires selection of a next hop by searching a load balancing path table or a specific algorithm according to the SFCFID carried in the SFC header of the packet.

In an exemplary embodiment, the method further includes the steps as follows.

When selecting a load balancing path, the SFF searches the load balancing path table to determine whether the load balancing path table contains a load balancing path corresponding to the SFCFID, and if the load balancing path corresponding to the SFCFID is searched, forwards the packet through the load balancing path; if the load balancing path corresponding to the SFCFID is not searched, selects a load balancing path to forward the packet by calculation, and a correspondence between the SFCFID and the load balancing path is recorded in the load balancing path table.

Or, when selecting the load balancing path, the SFF searches a load balancing path table to determine whether the load balancing path table contains a load balancing path corresponding to the SFCFID, and if the load balancing path corresponding to the SFCFID is searched, forwards the packet through the load balancing path; if the load balancing path corresponding to the SFCFID is not searched, selects a load balancing path to forward the packet by calculation, and a correspondence between the SFCFID and the load balancing path is recorded in the load balancing path table, and the correspondence is recorded in a load balancing path table of a symmetric SFC path corresponding to the present SFC path.

In an exemplary embodiment, the method further includes the steps as follows.

The SFF receives an SF deregistration message.

After receiving the SF deregistration message sent by the controller, the SFF deletes a corresponding load balancing path and entries in a corresponding load balancing path table.

In an exemplary embodiment, the method further includes the steps as follows.

The controller sends a load balancing path deleting message to a classification device or a load balancing controller.

The classification device or the load balancing controller recycles a corresponding SFCFID according to the received load balancing path deleting message.

An embodiment of the present disclosure also provides an SFF. The SFF includes a receiving unit and a forwarding unit.

The receiving unit is configured to receive a packet; herein an SFC header of the packet carries an SFCFID.

The forwarding unit is configured to forward the packet in a load balancing path according to the SFCFID carried in the SFC header of the packet.

In an exemplary embodiment, the receiving unit includes a first receiving module, configured to receive a packet sent by a classification device or an SFF connected to a last hop SF entity; and the forwarding unit includes a first forwarding module, configured to, when the SFF is connected to two or more SF entities, and after receiving the packet sent by the classification device or the SFF connected to the last hop SF entity, select one of the two or more SF entities to forward the packet according to the SFCFID carried in the SFC header of the packet.

In an exemplary embodiment, the receiving unit further includes a second receiving module, configured to receive a packet sent by a connected SF entity; and the forwarding unit further includes a second forwarding module, configured to, when a next hop of the SFF includes two or more SF entities, and after receiving the packet sent by the connected SF entity, send the packet to an SFF connected to one of the two or more SF entities according to the SFCFID carried in the SFC header of the packet.

In an exemplary embodiment, the SFF further includes an update unit. The update unit includes:

a third receiving module, configured to receive an SF registration message, herein the SF registration message includes an SFPID and an identifier corresponding to a new SF entity;

a judgment module, configured to, after receiving the SF registration message, read the SFPID in the SF registration message, and judge, according to the SFPID in the SF registration message, whether the SFF is on a path indicated by the SFPID;

a first update module, configured to, when a judgment result is that the SFF is on the path indicated by the SPFID, enable the SFF to add the new SF entity as an SF entity connected to the SFF;

a second update module, configured to, when a judgment result is that the SFF is not on the path indicated by the SPFID, enable the SFF to add an SFC path where the new SF entity is located into a local forwarding table;

and/or, the update unit further includes a fourth receiving module and a third update module, herein the fourth receiving module is configured to receive a forwarder registration message, herein the forwarder registration message includes an SFPID, an identifier of the new SF entity, and information for indicating a position of the new SF entity in an SFC; and the third update module is configured to, after receiving the forwarder registration message sent by a controller, add the new SF entity as a next hop of the SFF according to the forwarder registration message.

In an exemplary embodiment, the forwarding unit further includes one or more of a first selection module, a second selection module and a third selection module.

The first selection module is configured to, when selecting a load balancing path, acquire a selection of a next hop by searching a load balancing path table or a specific algorithm according to the SFCFID carried in the SFC header of the packet.

The second selection module is configured to, when selecting the load balancing path, search the load balancing path table to determine whether the load balancing path table contains a load balancing path corresponding to the SFCFID, and if the load balancing path corresponding to the SFCFID is searched, forward the packet through the load balancing path; and if the load balancing path corresponding to the SFCFID is not searched, calculate a next hop in a load balancing path, and record a correspondence between the SFCFID and the load balancing path in the load balancing path table.

The third selection module is configured to, when selecting the load balancing path, search the load balancing path table to determine whether the load balancing path table contains a load balancing path corresponding to the SFC-FID, and if the load balancing path corresponding to the SFCFID is searched, forward the packet through the load balancing path; and if the load balancing path corresponding to the SFCFID is not searched, calculate a next hop in a load balancing path, record a correspondence between the SFC-FID and the load balancing path in the load balancing path table, and record the correspondence in a load balancing path table of a symmetric SFC path corresponding to the present SFC path.

In an exemplary embodiment, the SFF further includes: a deleting unit configured to, receive an SF deregistration message; and after receiving the SF deregistration message sent by the controller, delete a corresponding load balancing path and entries in a corresponding load balancing path table.

An embodiment of the present disclosure also provides a classification device. The classification device includes:

an encapsulating unit, configured to encapsulate a packet, herein, to encapsulate a packet includes addition of an SFCFID carried in an SFC header corresponding to the packet; and a sending unit, configured to send the encapsulated packet to an SFF.

In an exemplary embodiment, the encapsulating unit includes:

an SFCFID encapsulating module, configured to receive a load balancing path adding message sent by a controller, and during encapsulation of the packet, encapsulate the SFCFID in the SFC header corresponding to the packet according to the load balancing path adding message.

An embodiment of the present disclosure also provides a controller. The controller includes:

a request processing unit, configured to add a new SF entity for bearing load balancing for an original SF entity in an SFC path according to a load sharing request; and a notification unit, including:

a first notification module, configured to, when an SFF corresponding to the new SF entity is on the SFC path, send an SF registration message to an SFF connected to the new SF entity;

a second notification module, configured to, when the SFF corresponding to the new SF entity is not on the SFC path, enable the controller to send a forwarder registration message to an SFF connected to a last hop of the original SF entity; and a third notification module, configured to send a load balancing path adding message to a classification device or a load balancer.

In an exemplary embodiment, the request processing unit further includes:

a configuration module, configured to configure an SFC-FID carried in an SFC header of a packet, and send the SFCFID to the classification device.

In an exemplary embodiment, the notification unit further includes:

a fourth notification module, configured to, when the SFF corresponding to the new SF entity is on the SFC path, send an SF deleting message to the SFF connected to the new SF entity;

a fifth notification module, configured to, when the SFF corresponding to the new SF entity is not on the SFC path, enable the controller to send a forwarder deleting message to the SFF connected to a last hop of the original SF entity; and a sixth notification module, configured to send a load balancing path deleting message to the classification device or the load balancer.

The embodiment of the present disclosure also provides an SFC system. The SFC system includes a controller, an SF entity, a classification device and an SFF. The controller is the controller as any one of the above, and the classification device is the classification device as any one of the above, and the SFF is the SFF as any one of the above.

An embodiment of the present disclosure also provides a computer storage medium. Computer-executable instructions are stored in the computer storage medium. The computer-executable instructions are used to execute the above-mentioned method.

Embodiments of the present disclosure have the following beneficial effects.

The embodiments of the present disclosure introduce load balancing of an SFC, and load balancing can be implemented in the SFC where SF entities are dynamically added, and an effective implementation method capable of performing load balancing on the SFC is provided. Therefore, the situation of excessive flow can be handled in time, and the reliability of a system is improved.

After the drawings and the detailed descriptions are read and understood, other aspects can be understood.

BRIEF DESCRIPTION OF DRAWINGS

FIG. 4A and FIG. 4B are diagrams of an SFC header of a packet.

FIG. 5 is another structural diagram of an SFC networking according to an embodiment of the present disclosure.

FIG. 6 is a further another structural diagram of an SFC networking according to an embodiment of the present disclosure.

DETAILED DESCRIPTION

To make those skilled in the art better understand the technical solution in the embodiments of the present disclosure, a method for load balancing of an SFC, an SFF, a classification device, a controller and an SFC system provided in the embodiments of the present disclosure will be described in detail hereinbelow with reference to the drawings.

Figure 1:
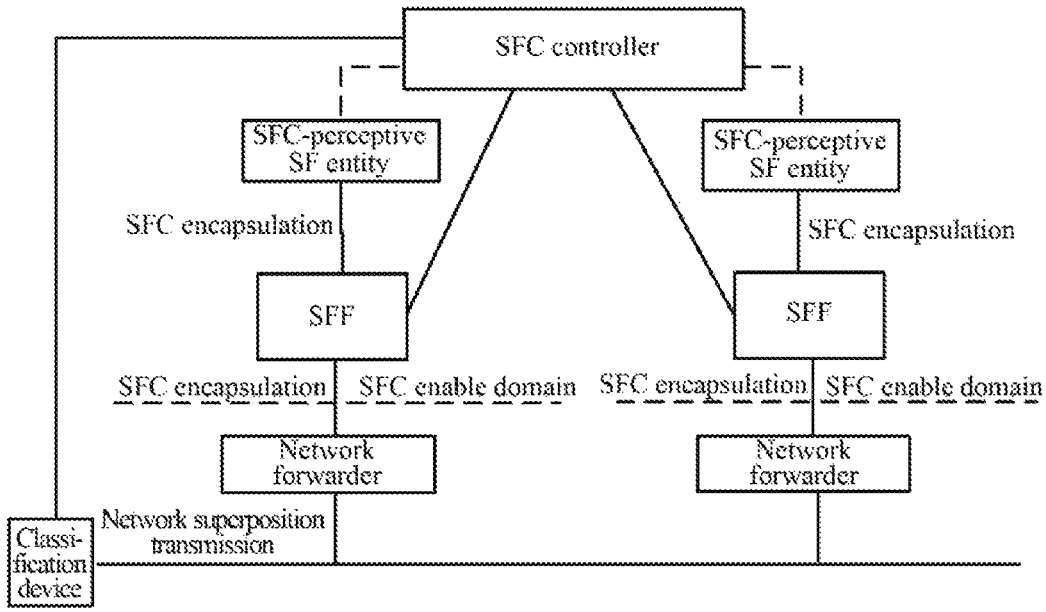
FIG. 1 is an architecture diagram of an SFC in the existing art.
Figure 2:
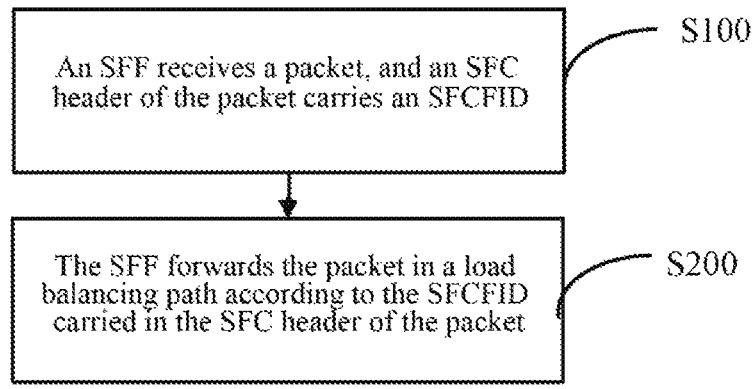
FIG. 2 is a flowchart of a method for load balancing of an SFC according to an embodiment of the present disclosure.

Referring to FIG. 2, FIG. 2 is a flowchart of a method for load balancing of an SFC according to an embodiment of the present disclosure. As shown in FIG. 2, the method includes the steps as follows.

In step S100, an SFF receives a packet, and an SFC header of the packet carries an SFCFID.

In step S200, the SFF forwards the packet in a load balancing path according to the SFCFID carried in the SFC header of the packet.

In an exemplary embodiment, in an embodiment of the present disclosure, before the SFF forwards the packet in a load balancing path according to the SFCFID carried in the SFC header of the packet, the method further includes that:

the SFF reads the SFCFID carried in the SFC header of the packet according to a load balancing identifier carried in the SFC header of the packet or a load balancing path to which a next hop of the SFF belongs.

In an embodiment of the present disclosure, when the SFF is connected to two or more SF entities, the step that the SFF forwards the packet in a load balancing path according to the SFCFID carried in the SFC header of the packet includes that:

after receiving a packet sent by a classification device or an SFF connected to a last hop SF entity, the SFF selects one of the two or more SF entities to forward the packet according to the SFCFID carried in the SFC header of the packet;

or, when the next hop of the SFF includes two or more SF entities, the step that the SFF selects one of load balancing paths to forward the packet according to the SFCFID carried in the SFC header of the packet includes that:

after receiving a packet sent by a connected SF entity, the SFF sends the packet to an SFF connected to one of the two or more SF entities according to the SFCFID carried in the SFC header of the packet.

In the of the present disclosure, before the step S100, the method further includes the steps as follows.

A new SF entity is added in an SFC path, herein the new SF entity is used for bearing load balancing for an original SF entity; a controller sends an SF registration message to an SFF connected to the new SF entity; and/or, when the SFF corresponding to the new SF entity is not on the SFC path, the controller sends a forwarder registration message to an SFF connected to a last hop of the original SF entity.

In an exemplary embodiment, when an SF entity is over-loaded, an SF entity may send a load sharing request to the controller, and the controller receives the load sharing request, and adds another new SF entity bearing the same service processing as the original SF entity into the SFC according to the load sharing request. Besides, the controller may monitor the working situation of the SF entities. When judging that a certain SF entity is over-loaded, the controller allocates a corresponding new SF entity to the certain SF entity.

In the embodiment of the present disclosure, under the condition of adding the new SF entity bearing load balancing for the original SF entity in the SFC path, the method further includes the steps as follows.

The controller sends a load balancing path adding message to a classification device or a load balancer.

The classification device encapsulates an SFCFID in an SFC header of a packet according to the received load balancing path adding message; or, the load balancer encapsulates an SFCFID in an SFC header of a packet according to the received load balancing path adding message; or, when needing to select a load balancing path for forwarding a packet, the classification device notifies the controller of the packet, receives a corresponding SFCFID sent by the controller, and encapsulates the corresponding SFCFID in the SFC header of the packet.

The method for load balancing of an SFC provided in the embodiment of the present disclosure further includes that:

the SFF receives an SF registration message sent by the controller, and according to the SF registration message, adds a corresponding new SF entity in a path indicated by a corresponding SFPID; and/or, the SFF receives a forwarder registration message sent by the controller.

In the embodiment of the present disclosure, according to the SF registration message, adding a corresponding new SF entity in a path indicated by a corresponding SFPID includes that: the SFF reads an SFPID in the SF registration message, and judges whether the SFF is on a path indicated by the SPFID according to the SFPID in the SF registration message; and when a judgment result is that the SFF is on the path indicated by the SPFID, the SFF adds the new SF entity as an SF entity connected thereto; and when a judgment result is that the SFF is not on the path indicated by the SPFID, the SFF adds an SFC path where the new SF entity is located into a local forwarding table.

In an embodiment of the present disclosure, the SF registration message includes an SFPID and an identifier corresponding to a new SF entity.

In an embodiment of the present disclosure, the forwarder registration message includes an SFPID, an identifier of the new SF entity, and information for indicating a position of the new SF entity in an SFC.

In an embodiment of the present disclosure, the SFF adds the new SF entity as a next hop thereof according to the forwarder registration message.

In an embodiment of the present disclosure, when selecting a load balancing path, the SFF acquires a selection of a next hop by searching a load balancing path table or a specific algorithm according to the SFCFID carried in the SFC header of the packet.

The method for load balancing of an SFC provided in the embodiment of the present disclosure further includes the following operations. When selecting a load balancing path, the SFF searches the load balancing path table to determine whether the load balancing path table contains a load balancing path corresponding to the SFCFID. If the load balancing path corresponding to the SFCFID is searched, the SFF forwards the packet through the load balancing path. If the load balancing path corresponding to the SFCFID is not searched, the SFF calculates a next hop in a load balancing path, and records a correspondence between the SFCFID and the load balancing path in the load balancing path table. In an exemplary embodiment, the present example is used for a stateful SFC. Many SF entities are stateful, and it is required to ensure that flows of the same session pass through the same SF entity, so it is required to ensure that the same SFCFID is allocated to the same flow. By means of the method for load balancing of an SFC provided in the present example, it can be ensured that the same SF entity is selected for the flows in the same state during the selection of a load balancing path.

The method for load balancing of an SFC provided in the embodiment of the present disclosure further includes the following operations. When selecting a load balancing path, the SFF searches a load balancing path table to determine whether the load balancing path table contains a load balancing path corresponding to the SFCFID. If the load balancing path corresponding to the SFCFID is searched, the SFF forwards the packet through the load balancing path. If the load balancing path corresponding to the SFCFID is not searched, the SFF calculates a next hop in a load balancing path, and records a correspondence between the SFCFID and the load balancing path in the load balancing path table, and records the correspondence in a load balancing path table of a symmetric SFC path corresponding to the present SFC path. In an exemplary embodiment, the present example is used for a bidirectional same-path symmetric SFC situation. Since many SF entities are stateful, it is required to ensure that flows of the same session pass through the same SF entity, and it is required to ensure that bidirectional flows pass through the same SF entity for a symmetric SFC. By means of the method for load balancing of an SFC provided in the present example, it can be ensured that the same SF entity is selected for the bidirectional flows in the symmetric SFC during the selection of a load balancing path.

The method for load balancing of an SFC provided in the embodiment of the present disclosure further includes the operations as follows.

The SFF receives an SF deregistration message.

After receiving the SF deregistration message sent by the controller, the SFF deletes a corresponding load balancing path and entries in a corresponding load balancing path table.

The method for load balancing of an SFC provided in the embodiment of the present disclosure further includes the operations as follows.

The controller sends a load balancing path deleting message to the classification device or a load balancing controller.

The classification device or the load balancing controller recycles a corresponding SFCFID according to the received load balancing path deleting message.

An embodiment of the present disclosure also provides a computer storage medium. A computer-executable instruction is stored in the computer storage medium. The computer-executable instruction is used to execute the above-mentioned method.

Description will be made hereinbelow with reference to specific implementation scenarios.

Embodiment One

Figure 3:
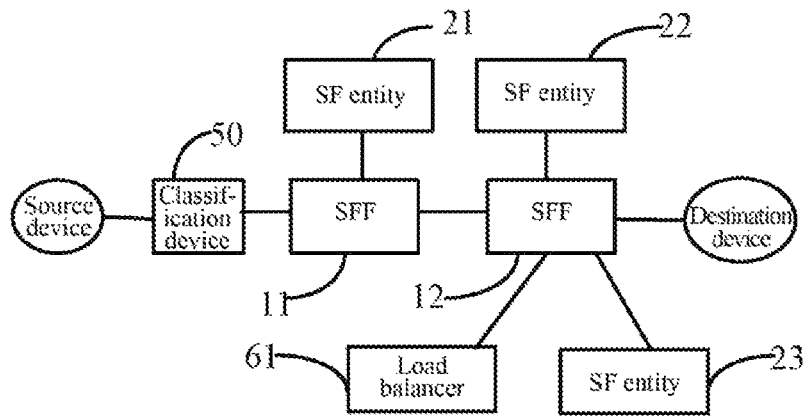
FIG. 3 is a structural diagram of an SFC networking according to an embodiment of the present disclosure.

Referring to FIG. 3, FIG. 3 is a structural diagram of an SFC networking according to an embodiment of the present disclosure. As shown in FIG. 3, a source device sends a flow to a destination device, and the flow needs to be processed by an SF entity 21 and an SF entity 22 and then reaches the destination device. The SF entity 21 and the SF entity 22 form an SFC. An SFC Path (SFP) of the SFC is: classification device 50→SFF 11→SF entity 21→SFF 11→SFF 12→SF entity 22→SFF 12→destination device.

When the SF entity 22 is over-loaded, it is required to add a new SF entity 23 to perform load sharing, and the added SF entity 23 is also connected to an SFF 12.

1. A controller will send an SF registration message to the SFF 12, and notifies the SFF 12 that the SF entity 23 will be added into the SFC. The SF registration message includes an SF ID of the SF entity 23, an SFPID of an SFC to be added, and a position Index of the SF entity 23 in the SFC.

2. After receiving the SF registration message, the SFF 12 adds the SF entity 23 in a load balancing path of the SFC according to SFPID and Index information carried therein.

3. The controller sends a load balancing path adding message to a classification device 50 to notify the classification device 50 of addition of a load balancing path to the SFC.

4. When receiving a flow sent from the source device to the destination device, the classification device 50 classifies the flow, and allocates an SFPID=100 according to an SFC through which the flow will pass. Meanwhile, the SFC has load balancing, so an SFCFID=0 will be allocated to the flow of a corresponding session 1, herein Hash allocation may be performed. Likewise, the classification device 50 classifies a flow of a session 2 from the source device to the destination device, and allocates an SFPID=100 according to an SFC through which the flow will pass. An SFCFID=1 will be allocated to the flow of the corresponding session through a Hash calculation manner or other manners. The SFPID and the SFCFID are encapsulated into an SFC header, and a packet with the SFC header is sent to a next-hop, i.e., SFF 11.

5. The SFF 11 without a load balancing path will forward the packet to the SF entity 21 for processing according to the value of the SFPID. After the SF entity 21 completely processes the packet, the packet is returned to the SFF 11. The SFF 11 then sends the packet to a next-hop, i.e., SFF 12.

6. After receiving the packet, the SFF 12 searches to find that the SFC has two load balancing paths according to the SFPID, so the flow will be split between the load balancing paths according to the SFCFID carried in the SFC header. If SFCFID=0, the packet is sent to the SF entity 22 for processing. If SFCFID=1, the packet is sent to the SF entity 23 for processing.

When the load of the SF entity 22 is alleviated, the SF entity 23 may be withdrawn from the SFC. At this moment, the controller sends an SF deregistration message to the SFF 12 and the classification device 50 respectively. After receiving the SF deregistration message, the SFF 12 removes the load balancing path from the present device. After receiving the SF deregistration message, the classification device 50 recycles the SFCFID in the SFC.

The SFC header here mainly includes two parts: one is an SFPID for identifying different SFCs and the other is an SFCFID for identifying different load balancing paths. The SFC header contains a basic header and metadata of the SFC. The SFPID is in the basic header of the SFC, and the SFCFID may be arranged in the basic header of the SFC, or may be arranged in the metadata of the SFC. Referring to FIG. 4A and FIG. 4B, FIG. 4A and FIG. 4B are diagrams of an SFC header of an exemplary packet provided in an embodiment of the present disclosure respectively. As shown in FIG. 4A, the SFCFID may be arranged in the basic header of the SFC. As shown in FIG. 4B, the SFCFID may be expressed by using metadata of a TLV. At this moment, a flag F is needed in the basic header to express that the present SFC header carries an SFCFID TLV. Settings of the above-mentioned identifiers are only for exemplary description.

Embodiment Two

Referring to FIG. 5, FIG. 5 is another structural diagram of an SFC networking according to an embodiment of the present disclosure. As shown in FIG. 5, a source device sends a flow to a destination device, and the flow needs to be processed by an SF entity 21 and an SF entity 22 and then reaches the destination device. The SF entity 21 and the SF entity 22 form an SFC. An SFP of the SFC is: classification device 50→SFF 11→SF entity 21→SFF 11→SFF 12→SF entity 22→SFF 12→destination device. When the SF entity 22 is over-loaded, it is required to add a new SF entity 24 to perform load sharing, and the SF entity 24 is connected to an SFF 14.

1. A controller will send an SF registration message to the SFF 14, and notifies the SFF 14 that the SF entity 24 will be added into the SFC. The message includes an SF ID of the SF entity 24, an SFPID of an SFC to be added, and a position Index of the SF entity 24 in the SFC.

2. After receiving the SF registration message, the SFF 14 adds the SF entity 24 into forwarding information of the SFC in a local forwarding table according to the above-mentioned SFPID and Index.

3. The controller further sends a forwarder registration message to a last hop, i.e., the SFF 11 according to internal topological information. The forwarder registration message includes an SFPID corresponding to the present SFC, a next hop and Index. After receiving the forwarder registration message, the SFF 11 adds the SFF 14 in a load balancing path of the present SFC.

4. At this moment the controller also sends a load balancing path adding message to a classification device 50 at an entrance to notify the classification device 50 of addition of a load balancing path to the SFC.

5. When receiving a flow of a session 1 sent from the source device to the destination device, the classification device 50 classifies the flow, and allocates an SFPID=100 according to an SFC through which the flow will pass. Meanwhile, the SFC has load balancing, so an SFCFID=0 will be allocated to the flow of the corresponding session in a Hash manner. Likewise, the classification device 50 classifies a flow of a session 2 from the source device to the destination device, and allocates an SFPID=100 according to an SFC through which the flow will pass. An SFCFID=1 will be allocated to the flow of the corresponding session through a Hash calculation manner or other manners. The SFPID and the SFCFID are encapsulated into an SFC header, and a packet with the SFC header is sent to a next-hop, i.e., the SFF 11.

6. The SFF 11 having load balancing paths to be selected will forward the packet to the SF entity 21 for processing according to the value of the SFPID. After the SF entity 21 completely processes the packet, the packet is returned to the SFF 11. The SFF 11 searches to find that a next hop has two load balancing paths during next-hop forwarding, so the flow will be split between the load balancing paths according to the SFCFID carried in the SFC header. If SFCFID=0, the packet is sent to a next-hop, i.e., the SFF 12. If SFCFID=1, the packet is sent to a next-hop, i.e., the SFF 14.

When the load of the SF entity 22 is alleviated, the SF entity 24 may be withdrawn from the SFC. At this moment, the controller sends SF deregistration messages to the SFF 14, the SFF 11 and the classification device 50 respectively. After receiving the SF deregistration messages, the SFF 14, the SFF 11 and the classification device 50 remove the load balancing path from the present device respectively.

Embodiment Three

In the present embodiment, an SFC has a load balancer serving as an SF entity. As shown in FIG. 3 and FIG. 5, a load balancer 61 is connected to an SFF 12 in FIG. 3 and an SFF 11 in FIG. 5 respectively.

In FIG. 3, a controller needs to notify a load balancer that a load balancing path is added into an SFC. Therefore, when a flow from a source device to a destination device is forwarded to the load balancer, the load balancer will allocate SFCFIDs to flows of different sessions according to a specific algorithm or other manners. For example, an SFCFID=0 is allocated to the flow of a session 1, and an SFCFID=1 is allocated to the flow of a session 2. After receiving a flow, an SFF 12 will perform a selection between an SF entity 22 and an SF entity 23 according to the SFCFID.

Likewise, in FIG. 5, the controller also needs to notify the load balancer that a load balancing path is added into the SFC. When a flow from a source device to a destination device reaches the load balancer, the load balancer will allocate SFCFIDs to flows of different sessions according to a specific algorithm or other manners. For example, an SFCFID=0 is allocated to the flow of a session 1, and an SFCFID=1 is allocated to the flow of a session 2. After receiving a flow, an SFF 11 will perform a selection between an SFF 12 and an SFF 14 according to the SFCFID.

Embodiment Four

In addition that a classification device 50 calculates SFCFIDs by itself, a centralized allocation manner may be also adopted. That is, the SFCFIDs are allocated by the classification device 50 through a controller.

When the classification device 50 receives a new packet, the classification device 50 will notify the controller of this packet first, and the controller calculates an SFCFID that shall be allocated to this packet, and then returns the calculated SFCFID to the classification device 50. At this moment, the classification device 50 encapsulates the packet according to the SFCFID allocated by the controller.

Embodiment Five

In an exemplary embodiment, since many SF entities are stateful, it is required to ensure that flows of the same session pass through the same SF entity, and it is required to ensure that bidirectional flows pass through the same SF entity for a symmetric SFC. Therefore, it is required to ensure that the same SFCFID is allocated to the same flow.

First, a controller needs to notify a classification device or a load balancer and a forwarder having a load balancing path through a packet that the present SFC is a stateful SFC, and load balancing must be performed in a table searching manner as shown in the present embodiment, and cannot be calculated by using a Hash algorithm.

No matter the classification device or the load balancer or the SFF having the load balancing path needs to store SFCFIDs corresponding to different flows. For the classification device or the load balancer, once an SFCFID is allocated to a packet received at the first time, the SFCFID cannot be modified, and will be stored in a load sharing table, as shown in Table 1. For a packet received subsequently, the load sharing table is searched first, and if the SFCFID is searched, an SFCFID is directly acquired. If the SFCFID is not searched, an SFCFID is allocated according to a corresponding algorithm, and the result is stored in the load sharing table. Table contents are illustrated with the embodiment shown in FIG. 3 herein.

TABLE 1

| Load sharing table | | |
|---|---|---|
| SFPID | Flow of session | SFCFID |
| 100 | Flow of session 1 from source device to destination device | 0 |
| 100 | Flow of session 2 from source device to destination device | 1 |

A forwarder having a load balancing path, such as an SFF 12 in Embodiment one, also needs a table recording a load balancing path forwarding situation, which may be as shown in Table 2.

TABLE 2

Load balancing path table

| SFPID | SFCFID | Next hop |
|---|---|---|
| 100 | 0 | SF entity 22 |
| 100 | 1 | SF entity 23 |

Embodiment Six

As shown in FIG. 6, for a bidirectional symmetric SFC, classification devices are needed in two directions. For a flow from left to right (source device 1 to destination device 1), an SFPID1 needs to be classified through a classification device 50, and an SFCFID1=100 needs to be planned through the classification device 50. For a flow from right to left (source device 2 to destination device 2), an SFPID2=200 needs to be classified through a classification device 52, and an SFCFID2 needs to be planned through the classification device 52. The SFPID1 and the SFPID2 are a group of symmetric SFCs for service chain processing of bidirectional flows. Supposed that after load sharing, a path from the source device 1 to the destination device 1 is: source device 1→classification device 50→SFF 11→SF entity 21→SFF 11→SFF 12→SF entity 22→SFF 12→destination device 1. A symmetric path from the source device 2 to the destination device 2 should be: source device 2→classification device 52→SFF 12→SF entity 22→SFF 12→SFF 11→SF entity 21→SFF 11→destination device 2. Here, the classification device 50 and the classification device 52 need to be capable of allocating the same SFCFID to the bidirectional flows of the same session, to ensure that the bidirectional flows can flow to the same SF entity for processing. When the SFF 12 receives left-to-right flow SFPID=100 and SFCFID=0, and forwards to a next-hop SF entity 22, the SFF 12 also records information of the SFCFID in entries of SFPID=200 symmetric to SFPID=100. That is, SFCFID=0 and a next hop, i.e., the SF entity 22 are recorded in entries of SFPID=200. Likewise, a forwarder will add a corresponding record into the entries of SFPID=200 according to the situation that the next hop of the flow SFPID=100 and SFCFID=1 is an SF entity 23.

At this moment, in the present embodiment, entries at the SFF 12 are as shown in Table 3:

TABLE 3

Load balancing path table

| SFPID | SFCFID | Next hop |
|---|---|---|
| 100 | 0 | SF entity 22 |
| 100 | 1 | SF entity 23 |
| 200 | 0 | SF entity 22 |
| 200 | 1 | SF entity 23 |

Figure 7:
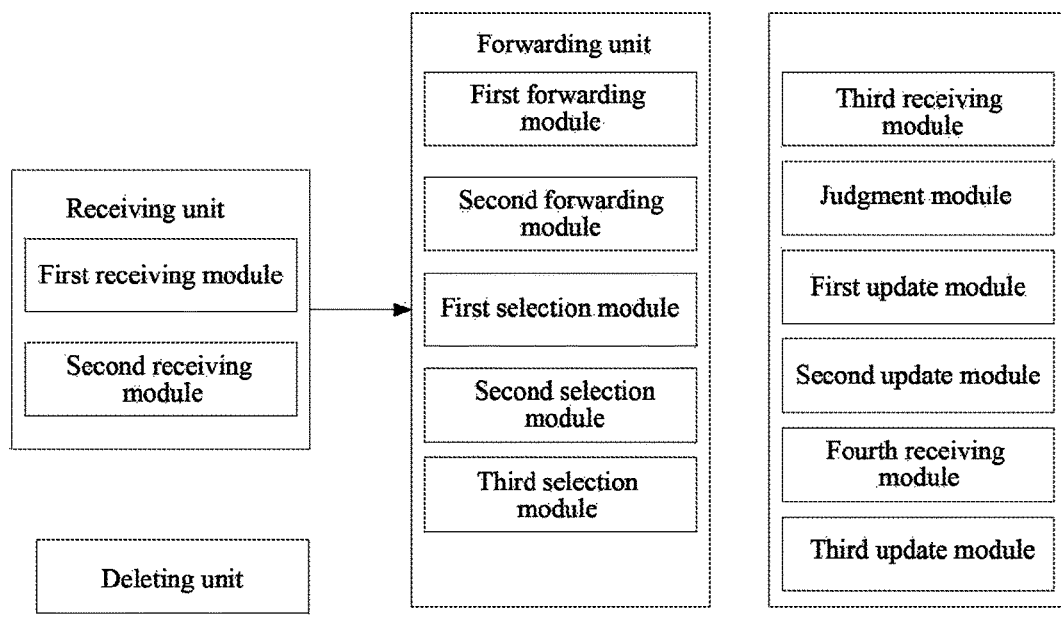
FIG. 7 is a structural diagram of an SFF according to an embodiment of the present disclosure.

On the basis of a concept identical or similar to the above-mentioned method embodiment, an embodiment of the present disclosure also provides an SFF. As shown in FIG. 7, the SFF includes a receiving unit and a forwarding unit.

The receiving unit is configured to receive a packet; herein an SFC header of the packet carries an SFCFID.

The forwarding unit is configured to forward the packet in a load balancing path according to the SFCFID carried in the SFC header of the packet.

In an embodiment of the present disclosure, the receiving unit includes a first receiving module, configured to receive a packet sent by a classification device or an SFF connected to a last-hop SF entity.

The forwarding unit includes a first forwarding module, configured to, when the SFF is connected to two or more SF entities, and after receiving the packet sent by the classification device or the SFF connected to the last hop SF entity, select one of the two or more SF entities to forward the packet according to the SFCFID carried in the SFC header of the packet.

In an embodiment of the present disclosure, the receiving unit further includes a second receiving module, configured to receive a packet sent by a connected SF entity.

The forwarding unit further includes a second forwarding module, configured to, when the next hop of the SFF includes two or more SF entities, and after receiving a packet sent by the connected SF entity, send the packet to an SFF connected to one of the two or more SF entities according to the SFCFID carried in the SFC header of the packet.

In an embodiment of the present disclosure, the SFF further includes an update unit. The update unit includes a third receiving module, a judgment module, a first update module and a second update module.

The third receiving module is configured to receive an SF registration message; herein the SF registration message includes an SFPID and an identifier corresponding to a new SF entity.

The judgment module is configured to, after receiving the SF registration message, read the SFPID in the SF registration message, and according to the SFPID in the SF registration message judge whether it is on a path indicated by the SFPID.

The first update module is configured to, when a judgment result is that it is on the path indicated by the SPFID, enable the SFF to add the new SF entity as an SF entity connected to the SFF.

The second update module is configured to, when a judgment result is that it is not on the path indicated by the SPFID, enable the SFF to add an SFC path where the new SF entity is located into a local forwarding table.

And/or, the update unit further includes a fourth receiving module and a third update module.

The fourth receiving module is configured to receive a forwarder registration message; herein the forwarder registration message includes an SFPID, an identifier of a new SF entity, and information for indicating a position of the new SF entity in an SFC.

The third update module is configured to, after receiving the forwarder registration message sent by a controller, add the new SF entity as a next hop thereof according to the forwarder registration message.

In an embodiment of the present disclosure, the forwarding unit further includes one or more of a first selection module, a second selection module and a third selection module.

The first selection module is configured to, when selecting a load balancing path, acquire a selection of a next hop by searching a load balancing path table or a specific algorithm according to the SFCFID carried in the SFC header of the packet.

The second selection module is configured to, when selecting a load balancing path, search the load balancing path table to determine whether the load balancing path table contains a load balancing path corresponding to the SFCFID, and if the load balancing path corresponding to the SFCFID is searched, forward the packet through the load balancing path; and if the load balancing path corresponding to the SFCFID is not searched, calculate a next hop in a load balancing path, and record a correspondence between the SFCFID and the load balancing path in the load balancing path table.

The third selection module is configured to, when selecting a load balancing path, search the load balancing path table to determine whether the load balancing path table contains a load balancing path corresponding to the SFCFID, and if the load balancing path corresponding to the SFCFID is searched, forward the packet through the load balancing path; and if the load balancing path corresponding to the SFCFID is not searched, calculate a next hop in a load balancing path, record a correspondence between the SFCFID and the load balancing path in the load balancing path table, and record the correspondence in a load balancing path table of a symmetric SFC path corresponding to the present SFC path.

In an embodiment of the present disclosure, the SFF further includes: a deleting unit, configured to, receive an SF deregistration message; and after receiving the SF deregistration message sent by the controller, delete a corresponding load balancing path and entries in a corresponding load balancing path table.

Figure 8:
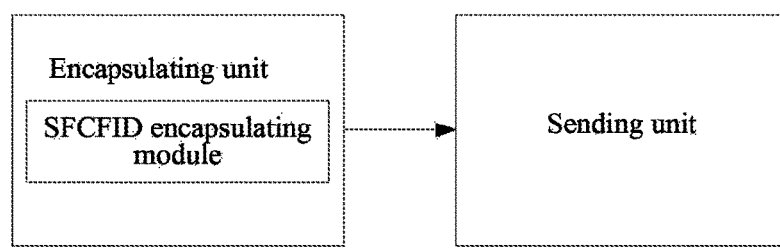
FIG. 8 is a structural diagram of a classification device according to an embodiment of the present disclosure.

On the basis of a concept identical or similar to the above-mentioned method embodiment, an embodiment of the present disclosure also provides a classification device. As shown in FIG. 8, the classification device includes an encapsulating unit and a sending unit.

The encapsulating unit is configured to encapsulate a packet; herein, to encapsulate a packet includes addition of an SFCFID carried in an SFC header corresponding to the packet.

The sending unit is configured to send the encapsulated packet to an SFF.

In an embodiment of the present disclosure, the encapsulating unit includes an SFCFID encapsulating module.

The SFCFID encapsulating module is configured to receive a load balancing path adding message sent by a controller, and during encapsulation of the packet, encapsulate the SFCFID in the SFC header corresponding to the packet according to the load balancing path adding message.

Figure 9:
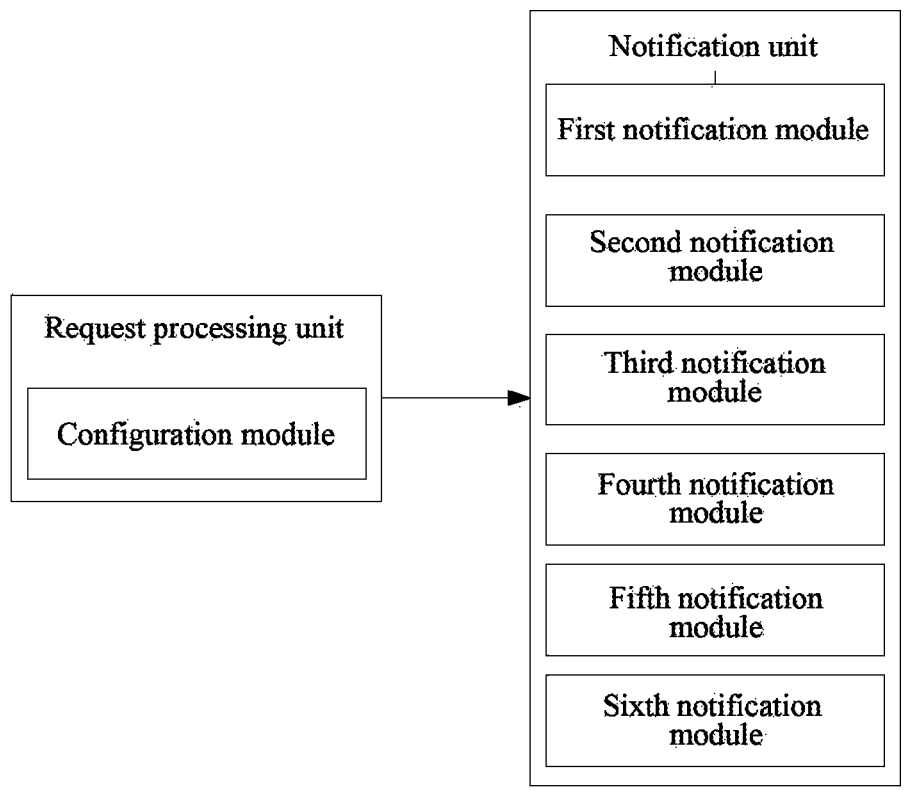
FIG. 9 is a structural diagram of a controller according to an embodiment of the present disclosure.

On the basis of a concept identical or similar to the above-mentioned method embodiment, an embodiment of the present disclosure also provides a controller. As shown in FIG. 9, the controller includes a request processing unit and a notification unit.

The request processing unit is configured to add a new SF entity for bearing load balancing for an original SF entity in an SFC path according to a load sharing request.

The notification unit includes a first notification module, a second notification module and a third notification module.

The first notification module is configured to, when an SFF corresponding to the new SF entity is on the SFC path, send an SF registration message to the SFF connected to the new SF entity.

The second notification module is configured to, when the SFF corresponding to the new SF entity is not on the SFC path, enable the controller to send a forwarder registration message to an SFF connected to a last hop of the original SF entity.

The third notification module is configured to send a load balancing path adding message to a classification device or a load balancer.

In an embodiment of the present disclosure, the request processing unit further includes a configuration module.

The configuration module configures an SFCFID carried in an SFC header of the packet, and sends the SFCFID to the classification device.

In an embodiment of the present disclosure, the notification unit further includes a fourth notification module, a fifth notification module and a sixth notification module.

The fourth notification module is configured to, when the SFF corresponding to the new SF entity is on the SFC path, send an SF deleting message to the SFF connected to the new SF entity.

The fifth notification module is configured to, when the SFF corresponding to the new SF entity is not on the SFC path, enable the controller to send a forwarder deleting message to an SFF connected to a last hop of the original SF entity.

The sixth notification module is configured to send a load balancing path deleting message to the classification device or the load balancer.

On the basis of a concept identical or similar to the above-mentioned embodiment, an embodiment of the present disclosure also provides an SFC system. The SFC system includes a controller, an SF entity, a classification device and an SFF, herein the controller is any controller provided in the embodiment of the present disclosure, and the classification device is any classification device provided in the embodiment of the present disclosure, and the SFF is any SFF provided in the embodiment of the present disclosure.

The above contents are further detailed descriptions for the present disclosure with reference to specific implementation manners, and it cannot be considered that the specific implementation of the present disclosure is only limited to these descriptions.

Those ordinary skilled in the art can understand that all or some of the steps of the above-mentioned embodiments may be implemented by using a computer program flow. The computer program may be stored in a computer-readable storage medium. The computer program is executed on a corresponding hardware platform (such as system, device, apparatus, and component, etc.). During execution, one of the steps of the method embodiment or a combination thereof is included.

In an exemplary embodiment, all or some of the steps of the above-mentioned embodiments may also be implemented by using an integrated circuit. These steps may be manufactured into individual integrated circuit modules respectively, or a plurality of modules or steps therein are manufactured into a single integrated circuit module for implementing.

Various apparatuses/functional modules/function units in the above-mentioned embodiments may be implemented by using a general computation apparatus. They may be centralized on a single computation apparatus, or may be distributed on a network formed by a plurality of computation apparatuses.

When various apparatuses/functional modules/function units in the above-mentioned embodiments is implemented in a form of a software function module and are sold or used as an independent product, they may be stored in a computer-readable storage medium. The above-mentioned computer-readable storage medium may be a read-only memory, a magnetic disk or an optical disk or the like.

INDUSTRIAL APPLICABILITY

The above-mentioned technical solution can handle the situation of excessive flow in time, and improve the reliability of a system.

We claim:

1. A method for load balancing of a Service Function Chain, SFC, comprising:
   receiving, by a Service Function Forwarder, SFF, a packet, wherein an SFC header of the packet carries a Service Function Chain Flow Identifier, SFCFID; and
   forwarding, by the SFF, the packet in a load balancing path according to the SFCFID carried in the SFC header of the packet;
   wherein the forwarding, by the SFF, the packet in a load balancing path according to the SFCFID carried in the SFC header of the packet comprises:
   when selecting a load balancing path, acquiring, by the SFF, a selection of a next hop by searching a load balancing path table or a specific algorithm according to the SFCFID carried in the SFC header of the packet;
   wherein the method further comprises:
   when selecting the load balancing path, searching, by the SFF, the load balancing path table to determine whether the load balancing path table contains a load balancing path corresponding to the SFCFID, and if the load balancing path corresponding to the SFCFID is searched, forwarding the packet through the load balancing path; if the load balancing path corresponding to the SFCFID is not searched, selecting a load balancing path to forward the packet by calculation, and recording a correspondence between the SFCFID and the load balancing path in the load balancing path table.

2. The method according to claim 1, further comprising:
   before the SFF forwards the packet in the load balancing path according to the SFCFID carried in the SFC header of the packet, reading, by the SFF, the SFCFID carried in the SFC header of the packet according to a load balancing identifier carried in the SFC header of the packet or a load balancing path to which a next hop of the SFF belongs.

3. The method according to claim 1, wherein
   the forwarding, by the SFF, the packet in a load balancing path according to the SFCFID carried in the SFC header of the packet comprises:
   when the SFF is connected to two or more Service Function (SF) entities,
   after the SFF receives a packet sent by a classification device or an SFF connected to a last hop SF entity, selecting one of the two or more SF entities to forward the packet according to the SFCFID carried in the SFC header of the packet;
   or,
   when a next hop of the SFF comprises two or more SF entities, selecting, by the SFF, one of load balancing paths to forward the packet according to the SFCFID carried in the SFC header of the packet comprises:
   after the SFF receives a packet sent by a connected SF entity, sending the packet to an SFF connected to one of the two or more SF entities according to the SFCFID carried in the SFC header of the packet.

4. The method according to claim 1, further comprising:
   adding a new SF entity in an SFC path, wherein the new SF entity is used for bearing load balancing for an original SF entity;
   sending, by a controller, an SF registration message to an SFF connected to the new SF entity; and/or, when the SFF corresponding to the new SF entity is not on the SFC path, sending, by the controller, a forwarder registration message to an SFF connected to a last hop of the original SF entity.

5. The method according to claim 4, further comprising:
   sending, by the controller, a load balancing path adding message to a classification device or a load balancer; and
   encapsulating, by the classification device, an SFCFID in an SFC header of a packet according to the received load balancing path adding message; or, encapsulating, by the load balancer, an SFCFID in an SFC header of a packet according to the received load balancing path adding message; or, when needing to select a load balancing path for forwarding a packet, notifying, by the classification device, the controller of the packet, and receiving a corresponding SFCFID sent by the controller, and encapsulating the corresponding SFCFID in the SFC header of the packet.

6. The method according to claim 1, further comprising:
   receiving, by the SFF, an SF registration message sent by a controller, and adding, according to the SF registration message, a corresponding new SF entity in a path indicated by a corresponding Service Function Path Identifier (SFPID);
   and/or,
   receiving, by the SFF, a forwarder registration message sent by the controller.

7. The method according to claim 6, wherein the adding, according to the SF registration message, a corresponding new SF entity in a path indicated by a corresponding SFPID comprises:
   reading, by the SFF, an SFPID in the SF registration message, and judging, according to the SFPID in the SF registration message, whether the SFF is on the path indicated by the SPFID;
   when a judgment result is that the SFF is on the path indicated by the SPFID, adding, by the SFF, the new SF entity as an SF entity connected to the SFF; and when a judgment result is that the SFF is not on the path indicated by the SPFID, adding, by the SFF, an SFC path where the new SF entity is located into a local forwarding table.

8. The method according to claim 6, wherein
   the SF registration message comprises an SFPID and an identifier corresponding to the new SF entity.

9. The method according to claim 6, wherein
   the forwarder registration message comprises an SFPID, an identifier of the new SF entity, and information for indicating a position of the new SF entity in an SFC.

10. The method according to claim 6, further comprising:
    adding, by the SFF, the new SF entity as a next hop of the SFF according to the forwarder registration message.

11. The method according to claim 1,
    wherein the method further comprises:
    recording the correspondence in a load balancing path table of a symmetric SFC path corresponding to the present SFC path.

12. The method according to claim 1, further comprising:
    receiving, by the SFF, an SF deregistration message; and
    after receiving the SF deregistration message sent by the controller, deleting, by the SFF, a corresponding load balancing path and entries in a corresponding load balancing path table.

13. The method according to claim 1, further comprising:
    sending, by the controller, a load balancing path deleting message to a classification device or a load balancing controller; and
    recycling, by the classification device or the load balancing controller, a corresponding SFCFID according to the received load balancing path deleting message.

14. A non-transitory computer storage medium in which computer-executable instructions are stored, and the computer-executable instructions being used to execute the method according to claim 1.

15. A Service Function Forwarder, SFF, comprising:
a computer; and
a non-transitory computer readable storage medium storing instructions that, when executed by the computer, cause the computer to perform steps comprising:
receiving a packet, wherein a Service Function Chain, SFC, header of the packet carries a Service Function Chain Flow Identifier, SFCFID; and
forwarding the packet in a load balancing path according to the SFCFID carried in the SFC header of the packet;
wherein the forwarding the packet in a load balancing path according to the SFCFID carried in the SFC header of the packet comprises:
when selecting a load balancing path, acquiring a selection of a next hop by searching a load balancing path table or a specific algorithm according to the SFCFID carried in the SFC header of the packet;
wherein the steps further comprise:
when selecting the load balancing path, searching the load balancing path table to determine whether the load balancing path table contains a load balancing path corresponding to the SFCFID, and if the load balancing path corresponding to the SFCFID is searched, forwarding the packet through the load balancing path; if the load balancing path corresponding to the SFCFID is not searched, selecting a load balancing path to forward the packet by calculation, and recording a correspondence between the SFCFID and the load balancing path in the load balancing path table.

16. The SFF according to claim 15, wherein the steps comprise:
receiving a packet sent by a classification device or an SFF connected to a last hop Service Function (SF) entity, and when the SFF is connected to two or more SF entities and after receiving the packet sent by the classification device or the SFF connected to the last hop SF entity, selecting one of the two or more SF entities to forward the packet according to the SFCFID carried in the SFC header of the packet;
receiving a packet sent by a connected SF entity, and when a next hop of the SFF comprises two or more SF entities and after receiving the packet sent by the connected SF entity, sending the packet to an SFF connected to one of the two or more SF entities according to the SFCFID carried in the SFC header of the packet; and
recording the correspondence in a load balancing path table of a symmetric SFC path corresponding to the present SFC path.

17. The SFF according to claim 15, wherein the steps comprise:
receiving an SF registration message, wherein the SF registration message comprises a Service Function Path Identifier, SFPID, and an identifier corresponding to a new SF entity;
after receiving the SF registration message, reading the SFPID in the SF registration message, and judging, according to the SFPID in the SF registration message, whether the SFF is on a path indicated by the SFPID;
when a judgment result is that the SFF is on the path indicated by the SPFID, enabling the SFF to add the new SF entity as an SF entity connected to the SFF;
when a judgment result is that the SFF is not on the path indicated by the SPFID, enabling the SFF to add an SFC path where the new SF entity is located into a local forwarding table;
receiving a forwarder registration message, wherein the forwarder registration message comprises an SFPID, an identifier of the new SF entity, and information for indicating a position of the new SF entity in an SFC;
after receiving the forwarder registration message sent by a controller, adding the new SF entity as a next hop of the SFF according to the forwarder registration message; and
receiving an SF deregistration message; and after receiving the SF deregistration message sent by the controller, deleting a corresponding load balancing path and entries in a corresponding load balancing path table.

18. A Service Function Chain, SFC, system, comprising a controller, a Service Function, SF, entity, a classification device and a Service Function Forwarder, SFF,
wherein the SFF is the SFF according to claim 15.

19. A system for load balancing of a Service Function Chain, SFC, comprising:
a Service Function Forwarder, SFF; and
a classification device, comprising a computer; and a non-transitory computer readable storage medium storing instructions that, when executed by the computer, cause the computer to perform steps comprising,
encapsulating a packet, wherein, to encapsulate a packet comprises addition of a Service Function Chain Flow Identifier, SFCFID, carried in a Service Function Chain, SFC, header corresponding to the packet; and
sending the encapsulated packet to the Service Function Forwarder, SFF; and
wherein the SFF performs additional steps comprising:
forwarding the packet in a load balancing path according to the SFCFID based on a load balancing path table or a specific algorithm; and
searching the load balancing path table to determine whether the load balancing path table contains a load balancing path corresponding to the SFCFID, and if the load balancing path corresponding to the SFCFID is searched, forwarding the packet through the load balancing path; if the load balancing path corresponding to the SFCFID is not searched, selecting a load balancing path to forward the packet by calculation, and recording a correspondence between the SFCFID and the load balancing path in the load balancing path table.

20. The system according to claim 19, wherein the steps comprise receiving a load balancing path adding message sent by a controller, and during encapsulation of the packet, encapsulating the SFCFID in the SFC header corresponding to the packet according to the load balancing path adding message.

* * * * *